United States Patent [19]

Itoh

[11] Patent Number: 4,685,358
[45] Date of Patent: Aug. 11, 1987

[54] HYDRAULIC CONTROL APPARATUS FOR HYDRAULICALLY-OPERATED POWER TRANSMITTING SYSTEM HAVING CONTINUOUSLY VARIABLE TRANSMISSION

[75] Inventor: Hiroshi Itoh, Toyota, Japan

[73] Assignee: Toyota Jidosha Kabushiki Kaisha, Aichi, Japan

[21] Appl. No.: 760,612

[22] Filed: Jul. 30, 1985

[30] Foreign Application Priority Data

Aug. 3, 1984 [JP] Japan ................... 59-162959

[51] Int. Cl.⁴ .............................. B60K 41/16
[52] U.S. Cl. ....................... 74/868; 74/689; 74/740
[58] Field of Search .......... 74/689, 740, 868

[56] References Cited

U.S. PATENT DOCUMENTS

| 3,505,910 | 4/1970 | Shimosaki | 74/868 X |
|---|---|---|---|
| 3,572,178 | 3/1971 | Kubo | 74/868 |
| 3,621,737 | 11/1971 | Vozumi | 74/868 |
| 3,643,527 | 2/1972 | Ohnuma | 74/868 |
| 4,329,888 | 5/1982 | Falzoni | 74/689 |
| 4,335,629 | 6/1982 | Falzoni | 74/689 |
| 4,392,394 | 7/1983 | Hofbauer et al. | 74/740 X |
| 4,393,731 | 7/1983 | Croswhite et al. | 74/740 X |
| 4,462,278 | 7/1984 | Murakami et al. | 74/868 |
| 4,543,852 | 10/1985 | Svab et al. | 74/740 X |

FOREIGN PATENT DOCUMENTS 60-37455  2/1985  Japan ........................ 74/689

Primary Examiner—Lawrence Staab
Assistant Examiner—Dwight G. Diehl
Attorney, Agent, or Firm—Parkhurst & Oliff

[57] ABSTRACT

A hydraulic control apparatus for controlling a hydraulically-operated power transmitting system for an automotive vehicle, the power transmitting system including a continuously variable transmission and an auxiliary transmission coupled to the continuously variable transmission. The auxiliary transmission has a first and a second forward-drive position relating to a high and a low speed range, respectively, which high and low speed ranges are selected by an operator controlled shift lever. The hydraulic control apparatus comprises a shift valve controlled by an electric control signal so as to be placed selectively in one of a high-range position and a low-range position to place the auxiliary transmission in the first and second forward-drive positions, respectively. The control apparatus further comprise a lock device for holding the shift valve in the high-range position, irrespective of the electric control signal, while the high speed range is selected by the shift lever.

4 Claims, 10 Drawing Figures

Fig. 2

| SHIFT POSITIONS | | HIGH-RANGE CLUTCH 56 | LOW-RANGE BRAKE BAND 58 | REVERSE BRAKE BAND 60 | SPEED RATIO OF AUX. TRANSMISSION |
|---|---|---|---|---|---|
| L(LOW) AND D(DRIVE) | LOW RANGE | X | O | X | $1 + \frac{P_1}{P_2}$ |
| | HIGH RANGE | O | X | X | — |
| N (NEUTRAL) | | X | X | X | — |
| R (REVERSE) | | X | X | O | $-(1 - \frac{1}{P_2})$ |

HYDRAULIC CONTROL APPARATUS FOR HYDRAULICALLY-OPERATED POWER TRANSMITTING SYSTEM HAVING CONTINUOUSLY VARIABLE TRANSMISSION

BACKGROUND OF THE INVENTION

1. Field of the Art

The present invention relates to a hydraulic control apparatus for controlling a hydraulically-operated power transmitting system used in an automotive vehicle, having a continuously variable transmission (hereinafter referred to as "CVT").

2. Related Art Statement

A power transmitting system for a vehicle including a CVT is provided with an auxiliary transmission for changing a direction of drive of the vehicle and for improvement in drivability. For example, a power transmitting system is disclosed in Japanese Patent Applications Nos. 58-144985 (laid open under Publication No. 60-37455) and 59-12017 (laid open under Publication No. 60-157554), which includes a CVT, and an auxiliary or secondary transmission connected in series to the CVT. In such a transmitting system, the auxiliary transmission is substantially always held in its high-range position for improved fuel economy while an operator controlled manual shift lever is set in a Drive position for an ordinary driving mode. While the manual shift lever is set in a Low position, the auxiliary transmission is substantially always placed in its low-range position for obtaining enough power for running up a slope, or for obtaining an engine-braking effect. For shifting up and down the auxiliary transmission between the low-range and high-range positions, the hydraulic system for the transmission uses a shift valve which is controlled by means of a solenoid valve. However, there is a possiblity that the solenoid valve may be operated due to an erroneously generated electric control signal and the auxiliary transmission may be shifted from its high-range position to its low-range position while the vehicle is running at a high speed in the Drive position. In such event, a shift-down shock is given to the auxiliary transmission.

SUMMARY OF THE INVENTION

It is therefore an object of the present invention to provide an improved hydraulic control apparatus for controlling a hydraulically-operated power transmitting system including a continuously variable transmission and an auxiliary transmission, which control apparatus is capable of protecting the auxiliary transmission from an unfavorable shift from its high-range position to its low-range position while the shift lever is in the Drive position, due to erroneous generation of electric control signals.

According to the present invention, there is provided a hydraulic control apparatus for controlling a hydraulically-operated power transmitting system for an automotive vehicle, the transmitting system having a continuously variable transmission and an auxiliary transmission coupled to the continuously variable transmission, the auxiliary transmission having a first and a second forward-drive position relating to a high and a low speed range, respectively, which high and low speed ranges are selected by an operator controlled shift lever, the hydraulic control apparatus comprising a shift valve with lock means. The shift valve is controlled by an electric control signal so as to be placed selectively in one of a high-range position and a low-range position to place the auxiliary transmission in the first and second forward-dirve positions, respectively. The lock means are provided for holding the shift valve in the high-range position, irrespective of the electric control singal while the high speed range is selected by the shift lever.

In the hydraulic control apparatus constructed as described above according to the invention, the lock means prevents the auxiliary transmission from being shifted from its first, high-range forward-drive position down to its second, low-range forward-drive position, thereby protecting the auxiliary transmission against a shift-down shock.

According to another aspect of the invention, there is also provided a hydraulic control apparatus for controlling a hydraulically-operated power transmitting system for an automotive vehicle, the power transmitting system including a continuously variable transmission and an auxiliary transmission coupled to the continuously variable transmission, the auxiliary transmission having a first and a second forward-drive position relating to a high and a low speed range, respectively, which high and low speed ranges are selected by an operator controlled shift lever of the vehicle, the hydraulic control apparatus comprising: (a) high-range frictional coupling unit hydraulically operated to establish the first forward-drive position of the auxiliary transmission; (b) a low-range frictional coupling unit hydraulically operated to establish the second forward-drive position of the auxiliary transmission; (c) a shift valve having a spool operable between a high-range position and a low-range position to control a hydraulic fluid to the high-range and low-range frictional coupling units, for placing the auxiliary transmission selectively in the first and second forward-drive positions; (d) a solenoid valve for controlling the shift valve so as to be placed selectively in the high-range and low-range positions; and (e) means for defining a control port through which a hydraulic control pressure is applied to the spool in the high-range position, for locking the spool in this high-range position while the high speed range is selected by the shift lever.

In the hydraulic control apparatus described above, a hydraulic control pressure is applied through the control port to the spool of the shift valve in the high-range position, for locking the spool in this high-range position while the high shift position is selected by the vehicle operator. Accordingly, the auxiliary transmission is protected against an unfavorable shift-down action from its first, high-range position to its second, low-range position if the solenoid valve is erroneously operated while the high speed range is selected.

According to one advantageous embodiment of the above aspect of the invention, the apparatus comprises means for applying a biasing hydraulic pressure to the spool of the shift valve in a direction toward its high-range position. The solenoid valve is operated between a first position to permit the biasing hydraulic pressure to be applied to the spool, and a second position to release the biasing hydraulic pressure.

According to a preferred form of the above embodiment, the spool of the shift valve has a first land which receives the biasing hydraulic pressure to bias the spool toward the high-range position while the spool is placed in the high-range position, and further has a second land which receives the biasing hydraulic pressure to bias the spool toward the high-range position while the spool is placed in the low-range position. The second land has a pressure-receiving area larger than that of the first land. The control port is disposed relativ to the spool so that the control port is located between the first and second lands while the spool is placed in the high-range position.

BRIEF DESCRIPTION OF THE DRAWING

The foregoing and other objects, features and advantages of the present invention will be readily appreciated as the same becomes better understood by reference to the following detailed description, when considered in connection with the accompanying drawings, in which:

FIG. 2 is a view showing a relation between shift positions of an auxiliary transmission and operating states of a frictional coupling assembly of the auxiliary transmission;

DETAILED DESCRIPTION OF THE PREFERRED EMBODIMENT

Referring to the accompanying drawing, a preferred embodiment of the invention will be described.

Figure 1:
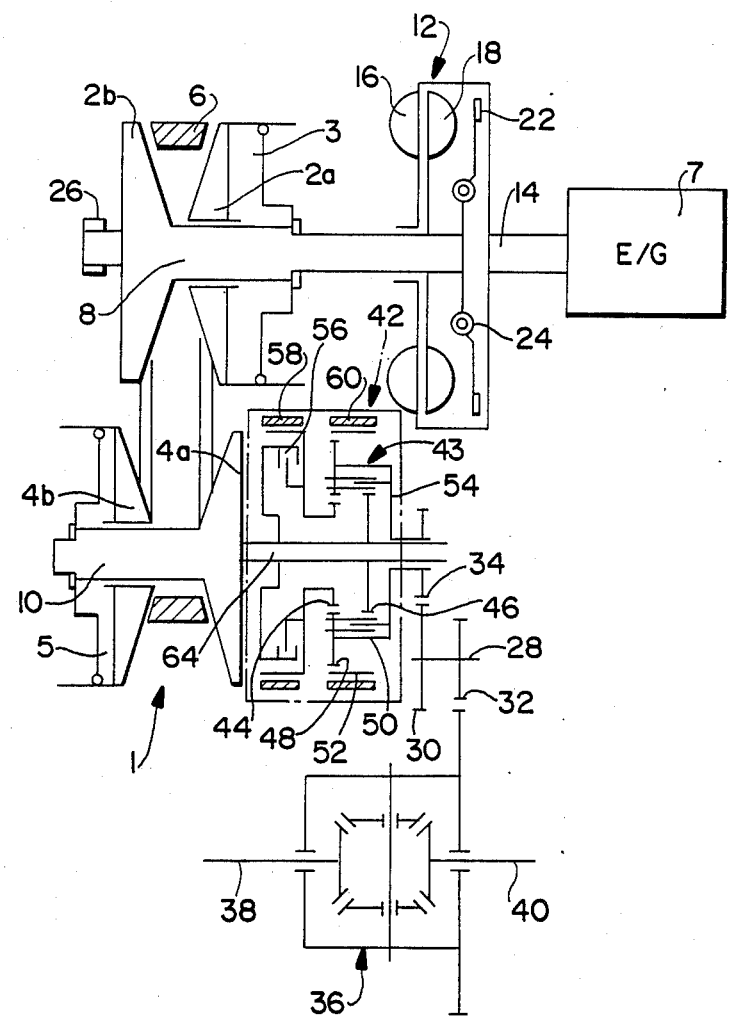
FIG. 1 is a schematic illustration of the essential parts of a power transmitting system incorporating a continuously variable transmission.

There is shown in FIG. 1 a continuously variable transmission (hereinafter referred to as "CVT") generally indicated at 1. The CVT 1 includes a pair of input pulley elements 2a, 2b which form a first variable-diameter pulley, a pair of output pulley elements 4a, 4b which form a second variable-diameter pulley, and a transmission belt 6 which connects the input and output pulley elements 2a, 2b and 4a, 4b to transmit power from an engine 7 of an automotive vehicle. The input pulley element 2a is disposed on an input shaft 8 such that the element 2a is movable axially of the input shaft 8 but not rotatably relative to the shaft 8. The outer input pulley element 2b is fixed to the input shaft 8. The output pulley element 4a is fixed to an output shaft 10, while the other output pulley element 4b is disposed on the output shaft 10 axially movable but not rotatable with respect to the shaft 10. The input pulley elements 2a, 2b, and the output pulley elements 4a, 4b have opposed surfaces which are tapered such that a distance between the tapered surfaces increases in a radially outward direction. In the meantime, the transmission belt 6 has a trapezoidal cross sectional shape to suit the opposed tapered surfaces of the pully elements 2a, 2b, 4a, 4b. An output pulley cylinder or actuator 5 is provided to move the output pulley element 4b, primarily for changing a tension of the belt 6. The hydraulic pressure to move the output pulley element 4b relative to the output pulley element 4a is controlled to be as low as possible to the extent that the transmission belt 6 may attain power transmission without slippage on the pulleys. In the meantime, an input pulley cylinder or actuator 3 is provided to move the input pulley element 2a, for changing an effective diameter of the first variable-diameter pulley 2a, 2b (a diameter at which the belt 6 engages the pulley). The hydraulic pressure to move the input pulley element 2a relative to the input pulley element 2b primarily determines a speed ratio "r" of the CVT 1 ($N_{in}/N_{out}$=ratio of a rotating speed $N_{in}$ of the input shaft 8 over a rotating speed $N_{out}$ of the output shaft 10). A fluid coupling 12 is provided, which has a pump impeller 16 connected to a crank shaft 14 of the engine 7, and a turbine 18 which is fixed to the input shaft 8 and is rotated by rotation of the pump impeller 16 via a fluid in the coupling 12. In the fluid coupling 12, there is incorporated a direct-coupling lock-up clutch 22 which serves to directly connect the crank shaft 14 to the input shaft 8. The direct-coupling lock-up clutch 22 is provided with dampers 24 which absorb or accommodate a shock upon disengagement of the lock-up clutch 22, and a variation in torque of the engine 7. When the running speed of the vehicle or the operating speed of the engine 7 exceeds a predetermined limit, the lock-up clutch 22 is engaged so as to prevent loss of power due to transmission by the fluid coupling 12. The pump impeller 16 is rotated together with an oil pump (FIG. 3) which delivers a pressurized fluid to the CVT 1, fluid coupling 12, etc., via a hydraulic control device which will be described. In parallel with the output shaft 10, there is disposed a counter shaft 28 to which are fixed two gears 30, 32. The engine power from the output shaft 10 of the CVT 1 is transmitted to a differential gear 36 through a gear 34 disposed coaxially with the ouptut shaft 10, and through the gears 30, 32 on the counter shaft 28. The power transmitted to the differential gear 36 is further transmitted to drive wheels of the vehicle via left and right axles 38, 40. An auxiliary transmission 42 is disposed coaxially with the ouptut shaft 10 of the CVT 1. This auxiliary transmission 42 inludes a complex planetary gear set 43 of RAVIGNEAUX type which includes a first and a second sun gear 44, 46, a first planetary gear 48 meshing with the first sun gear 44, a second planetary gear 50 meshing with the second sun gear 46, a ring gear meshing with the first planetary gear, and a plane carrier 54 which rotatably supports the first and second planetary gears 48, 50. The second sun gear 46 is coupled to a shaft 64 which is integral with the output shaft 10 of the CVT 1 and which serves as an input shaft of the auxiliary transmission 42. The carrier 54 is connected to the gear 34. A high-range clutch 56 is applied to connect the first sun gear 44 and the shaft 64, while a low-range brake band 58 is applied to hold the first sun gear 44 stationary. The ring gear 52 is held stationary by a reverse brake band 60. The high-range clutch 56, low-range brake band 58 and reverse brake band 60 are operated by actuators 57, 59 and 61 (FIG. 5), respectively. The high-range clutch 56 and its actuator 57 constitute a high-range frictional coupling unit for establishing a first forward-drive position of the auxiliary transmission 42, while the low-range brake band 58 and its actuator 59 constitute a second frictional coupling unit for establishing a second forward-drive position of the transmission 42. These frictional coupling units, and the reverse brake band 60 and its actuator constitute a frictional coupling assembly of the power transmitting system of the vehicle.

FIG. 2 shows operating states of the above elements of the frictional coupling assembly build in the auxiliary transmission 42, and speed reduction ratios, in relation with shift positions of the transmission 42. In the figure, marks "o" indicate the engagement or application of the clutch or band 56, 58, 60, while marks "x" indicate their disengagement or release. Values p1 and p2 are obtained from the following equations:

$p1 = Zs1/Zr$ $p2 = Zs2/Zr$ where
Zs1: number of teeth of the first sun gear 44,
Zs2: number of teeth of the second sun gear 46,
Zr: number of teeth of the ring gear 52.

Stated more specifically, a low range position of the transmission 42 is established with the first sun gear 44 held stationary by application of the low-range brake band 58. In this low range position, the power transmission by the auxiliary transmission 42 is effected at a reduction ratio of $(1+p1/p2)$. A high range position is established by the engagement of the high-range clutch 56, which causes the planetary gear set 43 to rotate together with the clutch 56. In this high range, the power transmission is effected at a reduction ratio of 1. In a shift position R (Reverse), the reverse brake band 60 is applied to hold the ring gear 52 stationary, whereby the power transmission is effected in the reverse direction at a reduction ratio of $(1-1/p2)$.

Figure 3:
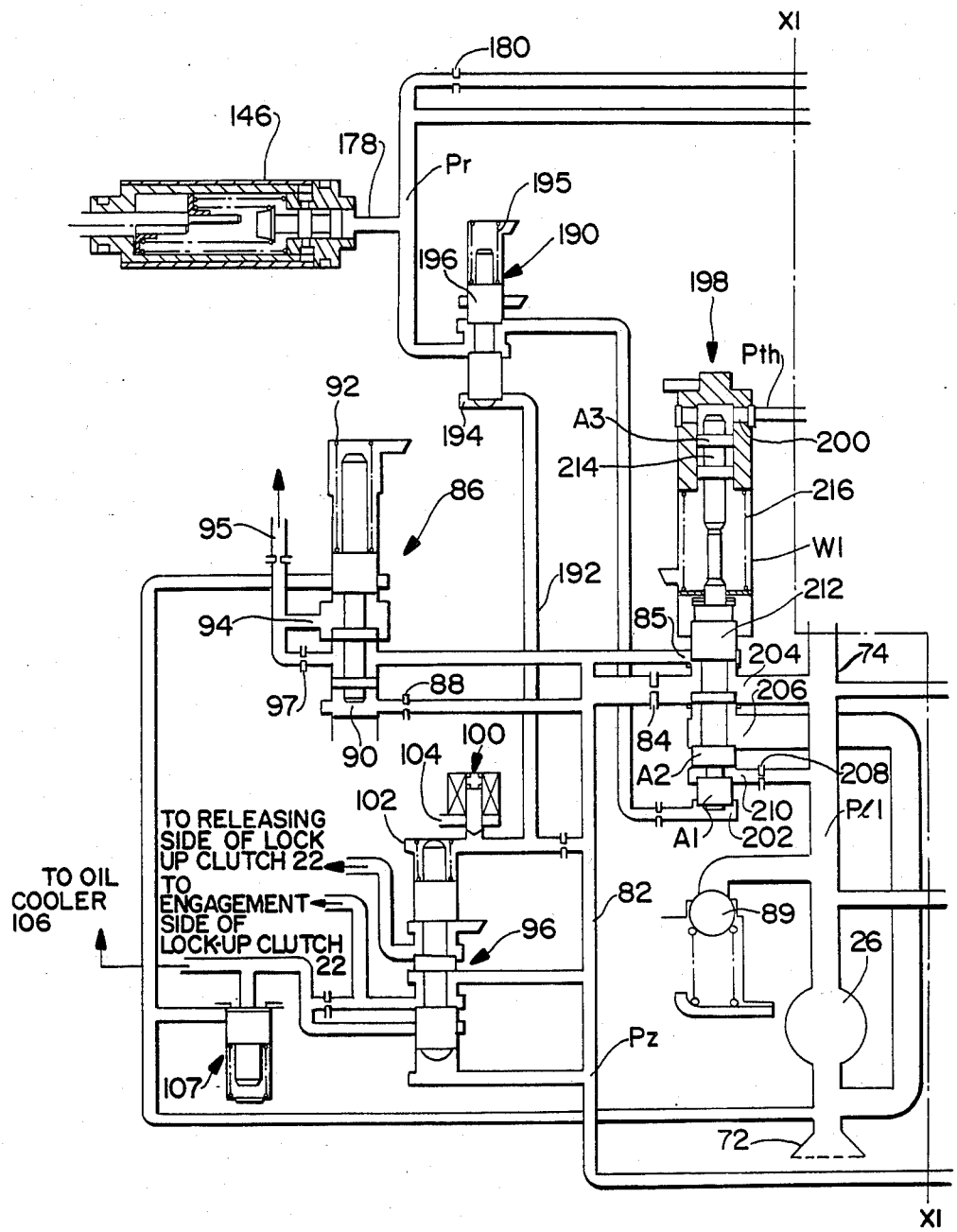
FIGS. 3 through 5 are schematic views of a hydraulic control device for controlling the operations of the continuously variable transmission and the auxiliary transmission of FIG. 1.
Figure 4:
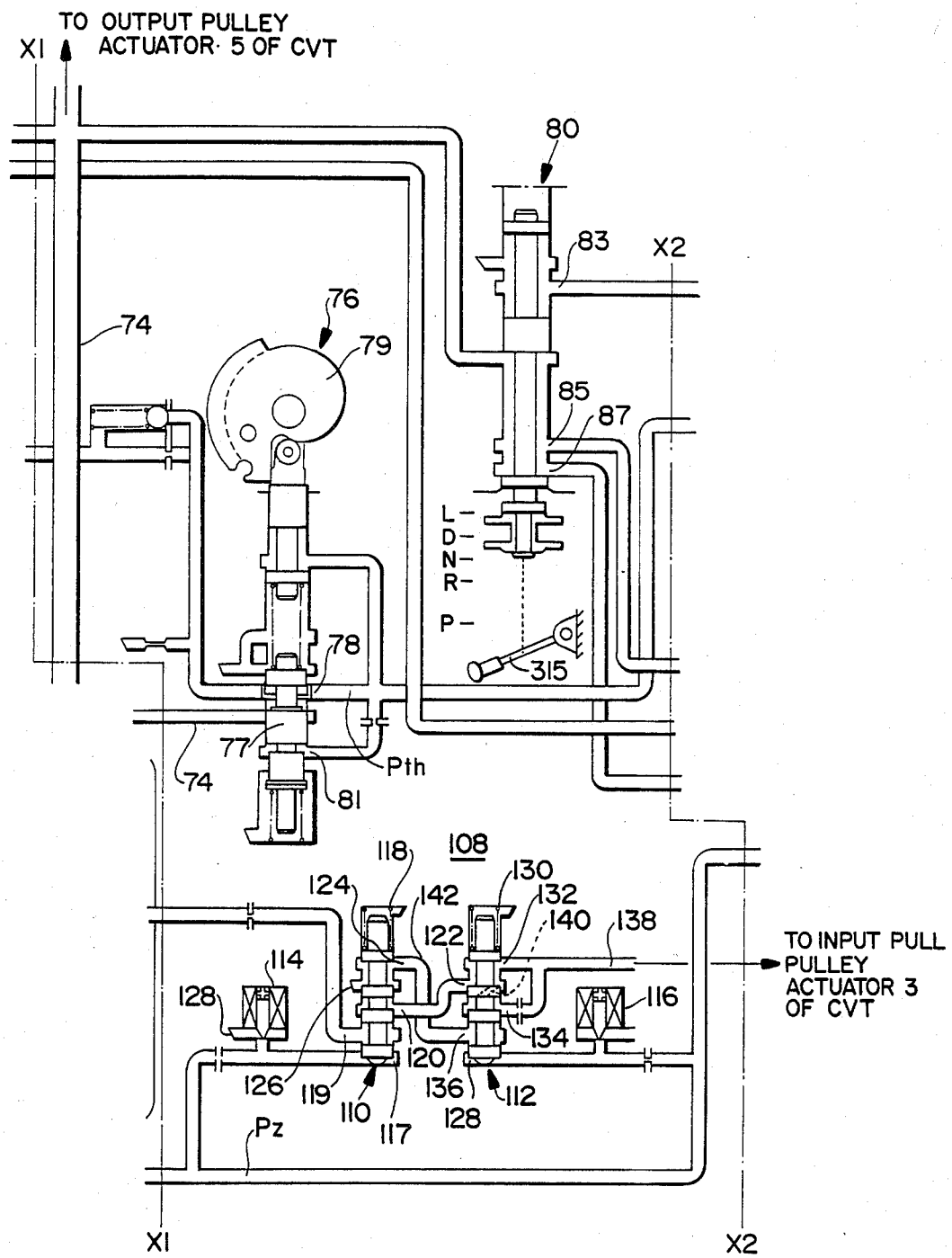
Figure 5:
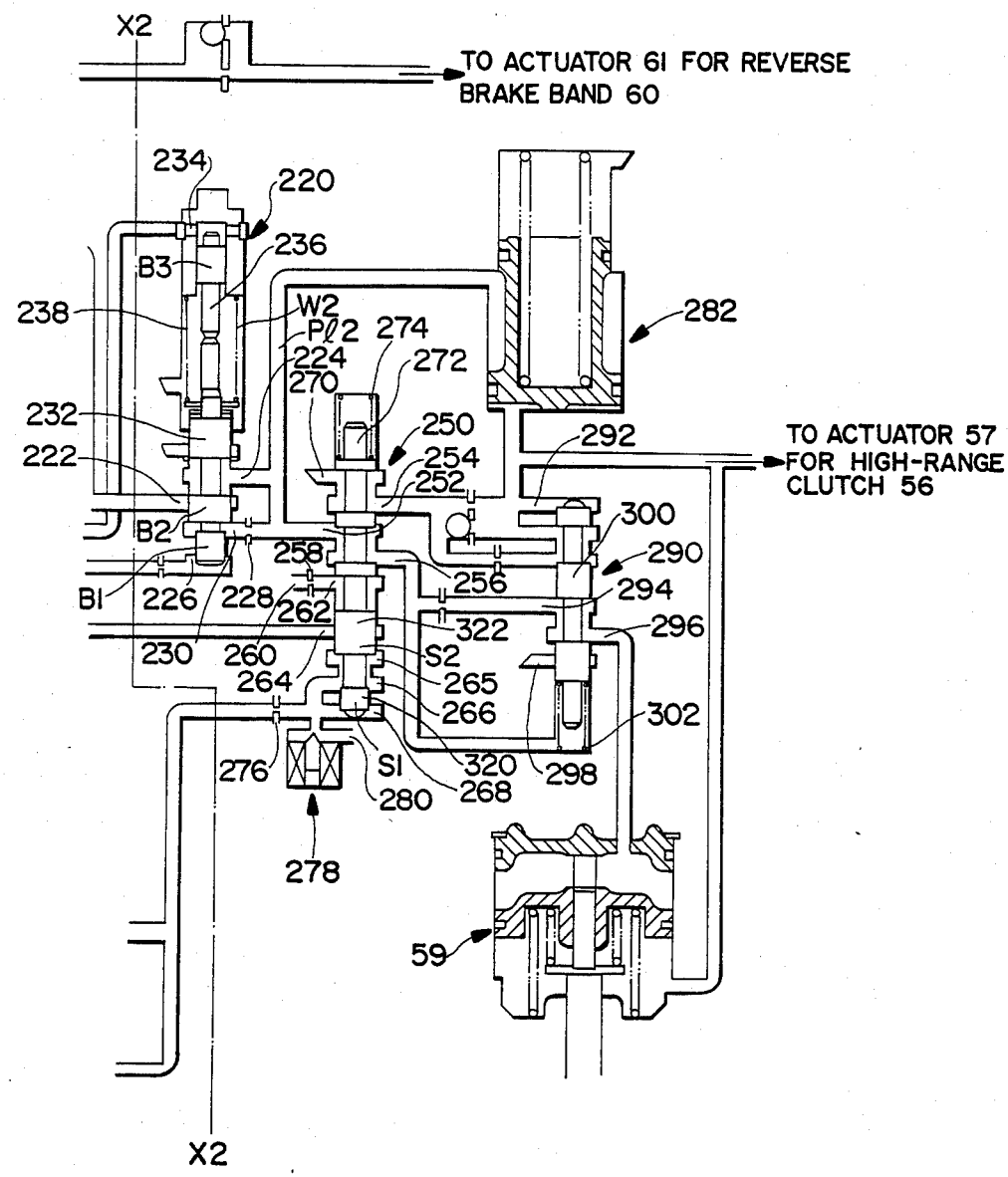

A hydraulic control arrangement is illustrated in FIGS. 3-5, wherein the oil pump 26 sucks up the working fluid through a strainer 72, and delivers the fluid under pressure to a line conduit 74. A throttle valve generally indicated at 76 in FIG. 4 generates at its output port 78 a throttle pressure "Pth" which corresponds to an angle $\theta$ of its opening. In other words, the throttle pressure "Pth" corresponds to an output torque of the engine 7. The throttle valve 76 has a valve spool 77 which receives an operating pressure, a throttle cam 79 that increases with the opening angle $\theta$, and the throttle pressure "Pth" from a control port 81 as a feedback pressure. The operating pressure and the feedback pressure act on the valve spool 77 in opposite directions. Thus, the valve spool 77 controls the communication between the line conduit 74 and the output port 78. There is provided a manual valve 80 having a spool whose axial position is changed according to a selected position of an operator controlled shift lever 315 which has five shift positions L (Low), D (Drive), N (Neutral), R (Reverse) and P (Parking). The manual valve 80 applies a first line presure Pl1 of the line conduit 74 to a port 83 when the shift position R (Reverse) is seledted, and applies the first line pressure Pl1 to a port 85 when the shift position L (Low) is selected. In the shift position D (Drive), the manual valve 80 applies the first line pressure Pl1 to ports 85 and 87.

To protect the hydraulic control device, a pressure relief valve 89 is provided adjacent to the oil pump 26, to release the working fluid from the line conduit 74 when the first line pressure Pl1 exceeds a predetermined upper limit.

A secondary pressure conduit 82 is connected to the line conduit 74 through an orifice 84, and through a port 85 of a primary pressure regulator valve 198 through which an excess of the fluid is drained from the valve 198. The secondary pressure conduit 82 is connected through an orifice 88 to a control chamber 90 which is formed in a secondary pressure regulator valve 86. This regulator valve 86 controls the communication between the secondary pressure conduit 82 and a port 94, according to the pressure in the control chamber 90 in relation to a biasing force of a spring 92, so that a secondary pressure Pz in the secondary pressure conduit 82 is maintained at a suitable level. The secondary pressure conduit 82 is connected to a lubrication conduit 95 via the port 94 or an orifice 97. The previously indicated direct-coupling lock-up clutch 22 incorporated in the fluid coupling 12 in parallel is engaged or disengaged under control of a lock-up control valve 96 which applies the secondary pressure Pz in the secondar pressure conduit 82 selectively to one of opposite sides (engagement side or release side) of the lock-up clutch 22. A solenoid valve 100 is provided to control the communication between a control chamber 102 of the lock-up control vavle 96 and a drain 104. When the solenoid valve 100 is off (deenergized), the secondary pressure Pz of the secondary pressure conduit 82 is applied to the release side of the lock-up clutch 22, whereby the power from the engine 7 is transmitted to the CVT 1 through the fluid-coupling 12. When the solenoid valve 100 is on (energized), the secondary pressure Pz of the secondary pressure conduit 82 is applied to the engagement side of the lock-up clutch 22 and to an oil cooler 106. In this condition, the engine power is transmitted to the CVT 1 through the lock-up clutch 22. The fluid pressure in the oil cooler 106 is adjusted by a cooler by-pass valve 107.

A speed-ratio control valve assembly is indicated generally at 108 in FIG. 4, which includes a first spool valve 110, a second spool valve 112, a first solenoid valve 114, and a second solenoid valve 116. While the first solenoid valve 114 is off, the spool of the first spool valve 110 is moved toward a spring 118 by the secondary pressure Pz ina control chamber 117. In this condition, the first line pressure Pl1 at a port 119 is applied to a port 122 of the second spool valve 112 via a port 120 of the first spool valve 110, and a port 124 is not in communication with a drain 126. While the first solenoid valve 114 is on, the spool of the first spool valve 110 is pushed toward the chamber 117 by the spring 118. In this condition, the line pressure is not applied to the port 120, and the port 124 is brought into communication with the drain 126. While the second solenoid valve 116 is off, the spool of the second spool valve 112 is pushed toward a spring 130 by the secondary pressure Pz in a control chamber 128. In this condition, the port 122 is not in communication with a port 132, and a port 134 is in communication with a port 136. The ports 132 and 134 are held in communication with the input pulley actuator 3 of the CVT 1 through a line 138. While the second solenoid valve 116 is on, the spool of the second spool valve 112 is moved toward the chamber 128 by the spring 130. In this condition, the ports 122 and 132 communicate with each other while the ports 134 and 136 are not in communication. The port 136 is connected with the port 124 through a line 142. An orifice 140 is provided in the second spool valve 112 to permit a small flow of the fluid from the port 122 to the port 132 while the second solenoid valve 116 is off. In the above arrangement, therefore, the fluid is supplied to the actuator 3 of the CVT 1 at a high rate while the first solenoid valve 114 is off and the second solenoid valve 116 is on, whereby the speed ratio "r" of the CVT 1 is decreased relatively rapidly. While the first and second solenoid valves 114 and 116 are both off, the supply of the fluid to the actuator 3 is accomplished through the orifice 140, and consequently the speed ratio "r" is decreased slowly. While the first and second solenoid valves 114 and 116 are both on, the actuator 3 of the CVT 1 is not supplied with the pressurized fluid, whereby the speed ratio "r" of the CVT 1 is held constant. While the first solenoid valve 114 is on and the second solenoid valve 116 is off, the fluid in the actuator 3 is discharged through the drain 126, and the speed ratio "r" of the CVT 1 is rapidly increased.

Figure 6:
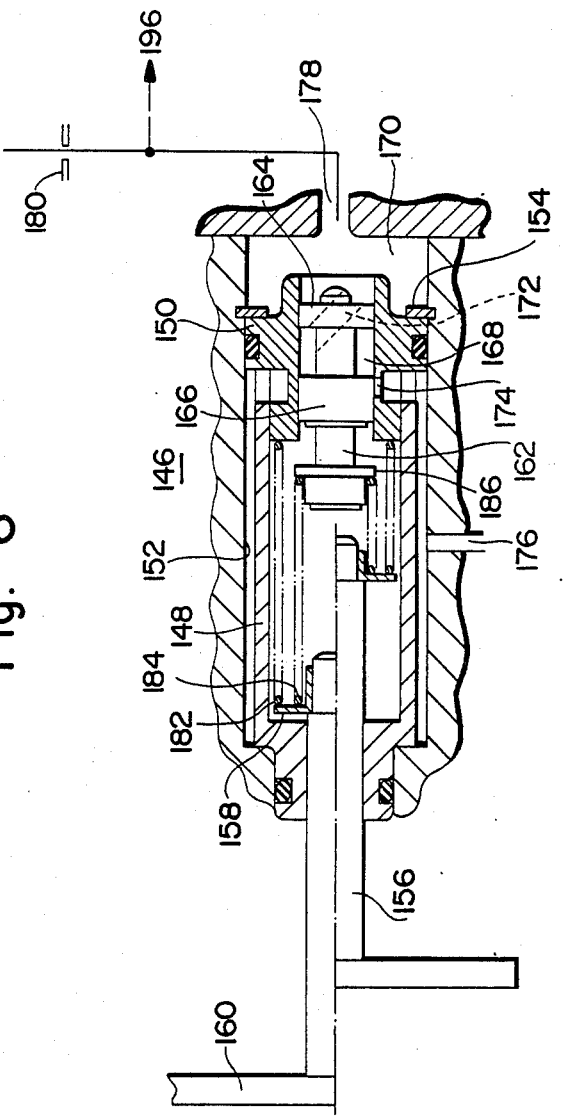
FIG. 6 is a view illustrating a speed-ratio sensing valve.
Figure 7:
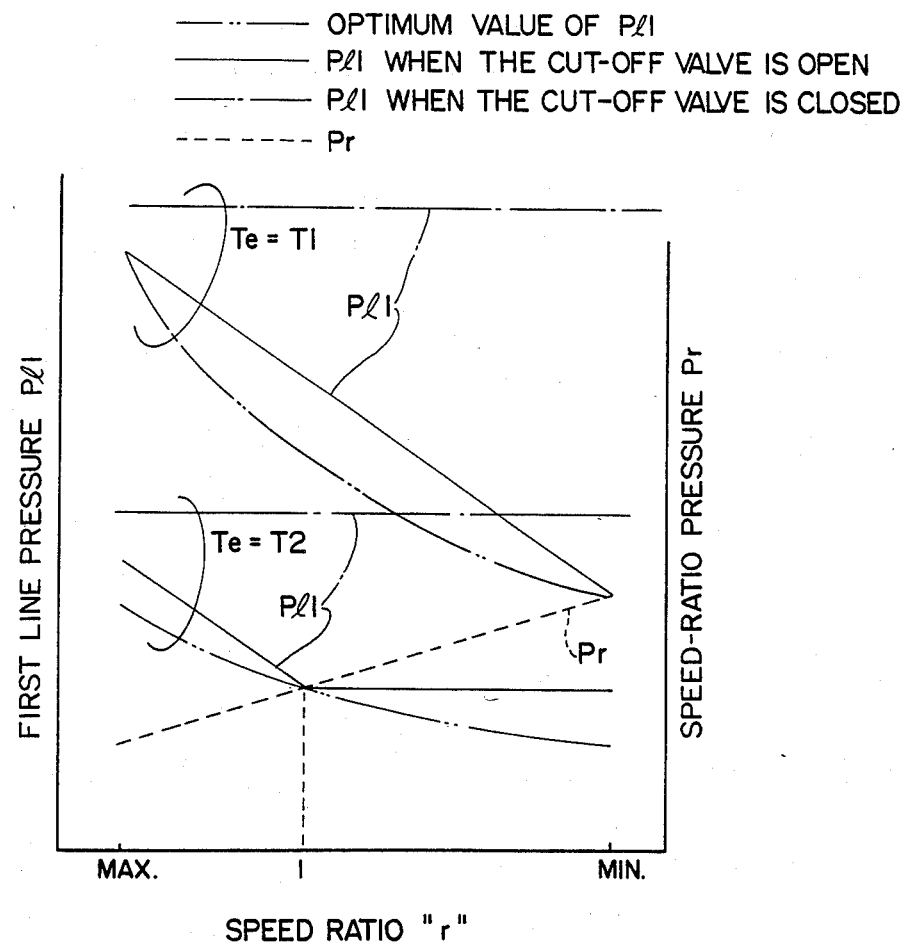
FIGS. 7 and 8 are graphical representations indicating characteristics of a first line pressure used to operate the continuously variable transmission.
Figure 8:
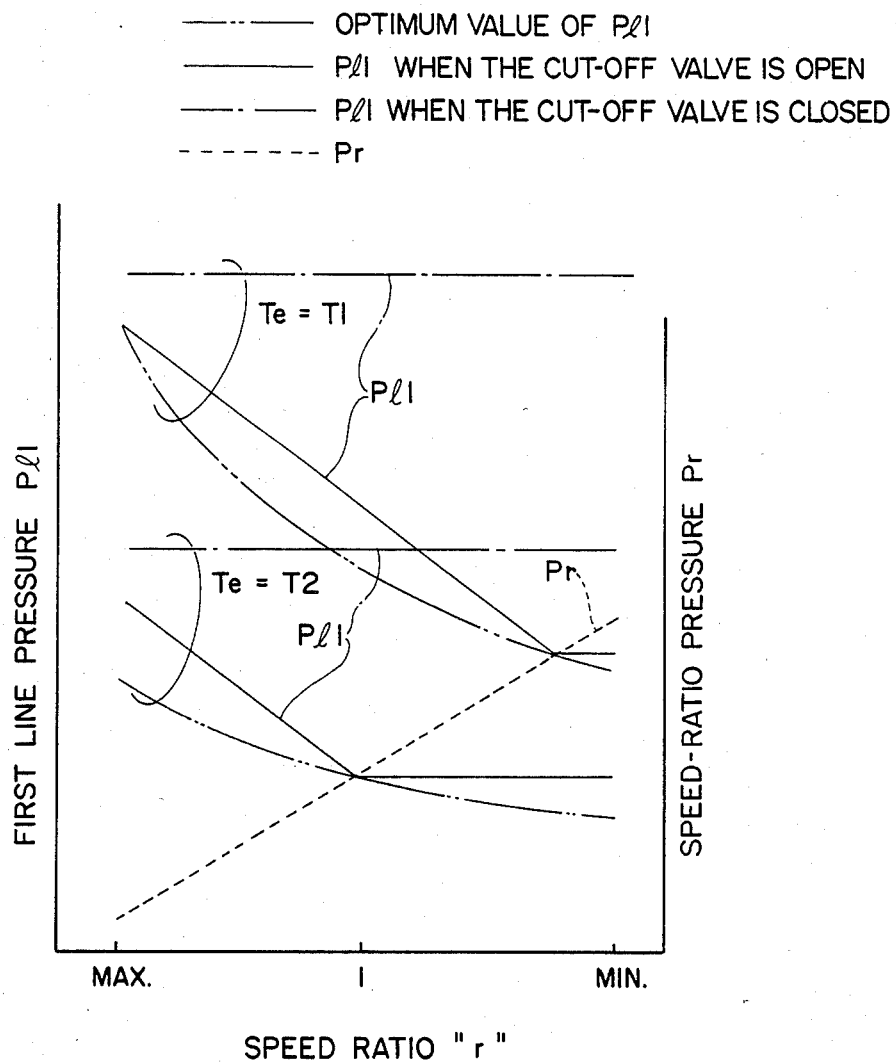

A speed-ratio sensing valve 146 is illustrated in detail in FIG. 6, wherein sleeves 148 and 150 are disposed coaxially within a bore 152, and retained in the axial direction by a retaining ring 154. A rod 156 extends through an end portion of the sleeve 148 and is retained by a spring seat 158. Another rod 160 is secured at its one end to the rod 156, and is held at its other end in engagement with the input pulley element 2a so that the element 2a is rotatble relative to the rod 160. The rod 160 moves the rod 156 in the axial direction by a distance equal to an amount of axial displacement of the input pulley element 2a. A spool 162 having lands 164 and 166 is axially slidably fitted in the sleeve 150. The spool 162 has a passage 172 which communicates with an annular space between the two lands 164, 166, and with an oil chamber 170. The land 166 controls an amount of opening of a port 174 with respect to the annular space 168. The port 174 communicates with a drain 176 via an annular space between the outer surface of the sleeve 148 and the inner surface of the bore 152. The oil chamber 170 is formed with an output port 178 from which a control pressure Pc is produced. The output port 178 communicates with the line conduit 74 via an orifice 180. A spring 182 is interposed between the spring seat 158 and the sleeve 150, to bias the rod 156 in a direction away from the sleeve 148. In the meantime, a spring 184 is interposed between the spring set 158 and a flange 186 of the spool 162, in order to bias the spool 162 in a direction toward the oil chamber 170. The speed ratio "r" of the CVT 1 is increased as the distance of the movable input pulley element 2a relative to the stationary input pulley element 2b is increased. Since the rod 156 is moved ouward from the sleeve 148 as the movable input pulley element 2a is moved away from the stationary input pulley element 2b, the force of the spring 184 biasing the spool 162 toward the oil chamber 170 is reduced. As a result, the spool 162 is moved toward the rod 156, and the land 166 increases the area of opening of the port 174, whereby a speed-ratio pressure Pr from the output port 178 is decreased. The speed-ratio pressure Pr is established by controlling the amount of fluid discharge from the output port 178. Accordingly, the speed-ratio pressure Pr is held not higher than the line pressure Pl1. Dashed lines in FIGS. 7 and 8 represent two different relations between the speed-ratio pressure Pr and the speed ratio "r". As described later, the first line pressure Pl1 is decreased as the speed ratio "r" is reduced. After the speed ratio "r" has fallen down to a speed ratio "r=1" (which varies as a function of the throttle pressure Pth, i.e., as a function of the engine torque Te) the speed-ratio pressure Pr is equal to the first line pressure Pl1. Two-dot chain lines in FIGS. 7 and 8 indicate an optimum value of the first line pressure Pl1, wherein T1 is greater than T2.

A cut-off valve 190 includes a chamber 194 which communicates with the control chamber 102 of the lock-up control valve 96 via a line 192, and further includes a spool 196 which is moved based on the pressure in the chamber 194 and a biasing force of a spring 195. While the solenoid valve 100 is off, that is, while the lock-up clutch 22 is released (for absorbing a shock of the transmission system when the axuiliary transmission 42 is shifted), the cut-off valve 190 is placed in its closed position to prevent the speed-ratio pressure Pr from being applied to the primary pressure regulator valve 198 via port 202.

The primary pressure regulator valve 198, which serves as first pressure-generating means, has: a port 200 to which the throttle pressure Pth is applied; a port 202 to which the speed-ratio pressure Pr is applied; a port 204 connected to the line conduit 74; a port 206 connected to a suction side of the oil pump 26; a port 210 to which the first line pressure Pl1 is applied via an orifice 208; a spool 212 which is axially movable to control the communication between the ports 204 and 206; a spool 214 which receives the throttle pressure Pth and biases the spool 212 toward the port 202; and a spring 216 which biases the spool 212 toward the port 202.

While the cut-off valve 190 is oepn and the speed-ratio pressure Pr is applied to the port 202, the following equation is established:

$$Pl1 = (A3 \cdot Pth + W1 - A1 \cdot Pr)/(A2 - A1) \quad (1)$$

where,
A1: cross sectioanl area of the lowermost land of the spool 212,
A2: cross sectional area of the land next to the lowermost land of the spool 212,
A3: cross sectional area of the land of the spool 214 receiving the throttle pressure Pth,
W1: biasing force of the spring 216.

While the cut-off valve 190 is closed and the speed-ratio pressure Pr is not applied to the port 202, the following equation is established:

$$Pl1 = (A3 \cdot Pth + W1)/(A2 - A1) \quad (2)$$

The pressures Pl1 defined by the above two equations are indicated by solid and one-dot chain lines, in FIGS. 7 and 8, respectively.

A sub-primary pressure regulator valve 220, which serves as second pressure-generating means, has: an input port 222 to which is applied the first line pressure Pl1 from the port 85 of the manual valve 80 while the shift position L or D is selected; an output port 224 from which a second line pressure Pl2 is generated; a port 226 to which the speed-ratio pressure Pr is applied; a port 230 to which is applied through an orifice 228 the second line pressure Pl2 which serves as a feedback pressure; a spool 232 which controls the communication between the input and output ports 222 and 224; a port 234 to which the throttle pressure Pth is applied; a spool 236 which receives the throttle pressure Pth and biases the spool 232 toward the port 226; and a spring 238 which biases the spool 232 toward the port 226. In this sub-primary pressure regulator valve 220, the following equation is established:

$$Pl2 = (B3 \cdot Pth + W2 - B1 \cdot Pr)/(B2 - B1) \quad (3)$$

where

B1: cross sectional area of the lowermost land of the spool 232,

B2: cross sectional area of the land next to the lowermost land of the spool 232, B3: cross sectioanl area of the land of the spool 236 receiving the throttle pressure Pth, W2: biasing force of the spring 238.

Figure 9:
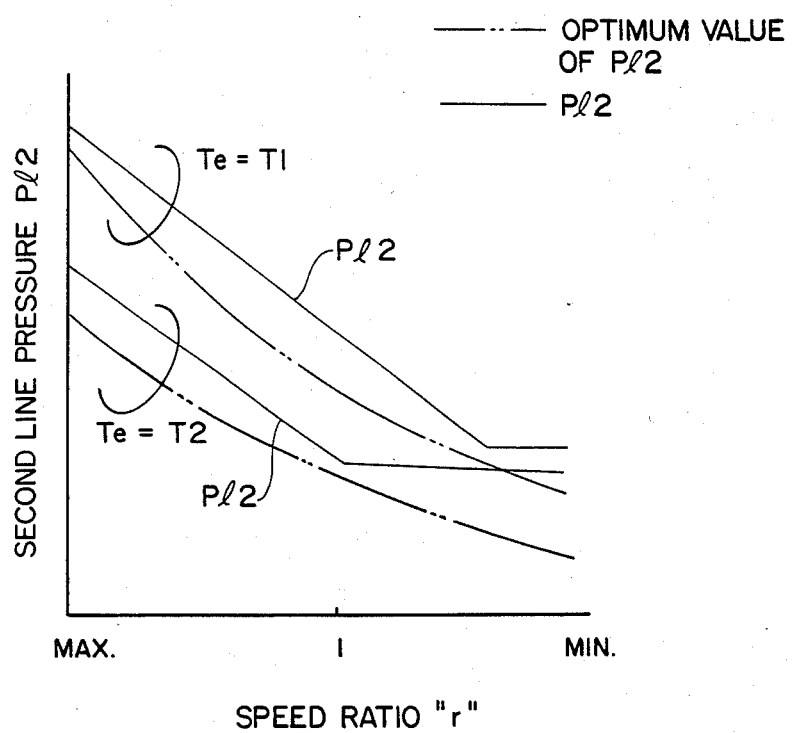
FIG. 9 is a graphical representation indicating characteristics of a second line pressure used to operate the auxiliary transmission.

FIG. 9 indicates a relation between the second line pressure Pl2 generated by the sub-primary pressure regulator valve 220, and its ideal value.

A shift valve 250 has: a port 252 to which is applied the second line pressure Pl2 while the shift position D or L is selected; output ports 254, 256; a port 262 communicating with a drain 260 via an orifice 258; a control port 264 to which is applied the first line pressure Pl1 from the port 87 of the manual valve 80 when the shift position D is selected; a control chamber 265; other control ports 266, 268; a darin 270; a spool 272; and a spring 274 biasing the spool 272 toward the port 268. The spool 272 has a first land 320 (as counted from the bottom of the spool) having a pressure-receiving area S1 (transverse cross sectioanl area), and a second land 322 (as counted from the bottom of the spool) having a pressure-receiving area S2 (transverse cross sectiaonl area) which is greater than the pressure-receiving surface S1 of the first land 320. The control port 264 is disposed relative to the first and second lands 320, 322 of the spool 272 so that the control port 264 is located between the first and second lands 320, 322 while the spool 272 is located in its high-range position on the side of the spring 274. In this high-range position, the control port 264 is held in communictaion with the control chamber 265. Namely, the control chamber 265 is adapted to communicate selectively with the control port 264 or with the control port 266, according to the position of the spool 272, as described later in detail. The secondary pressure Pz is applied to the control ports 266, 268 via an orifice 276, and the pressure at the control pors 266, 268 is regulated by a solenoid valve 278. The solenoid valve 278 is turned on and off in relation to driving parameters of an automotive vehicle. While the solenoid valve 278 is on, the fluid is discharged from a drain 280.

When the spool 272 is located in the high-range position (on the side of the spring 274), the input port 252 is in communication with the output port 254, and the output port 256 is in communication with the drain 260 via the port 262 and the orifice 258. Accordingly, the second line pressure Pl2 is delivered from the output port 254 to an accumulator 282, and to an actuator 57 of the high-range clutch 56, whereby the auxiliary transmission 42 is placed in the high-range position.

When the spool 272 is located in its low-range position (on side of the port 268), the input and output ports 252, 256 communicate with each other, and the output port 254 is in communication with the drain 270. Consequently, the second line pressure Pl2 from the output port 256 is delivered to an actuator 59 of the low-range brake band 58, whereby the auxiliary transmission 42 is placed in the low-range position.

While the shift position L is selected, the first line pressure Pl1 is not applied to the control port 264. Therefore, when teh solenoid valve 278 is turned off, the spool 272 is moved toward the spring 274 initially by the secondary pressure Pz acting on the second land 322 with the pressure-receiving area S2, and subsequently by the secondary pressure Pz acting on the first land 320 with the pressure-receiving area S1. When the solenoid valve 278 is turned on, the pressure at the control ports 272, 268 is decreased and the pool 272 is moved by the spring 274 toward the port 268. In the shift position L, therefore, the auxiliary transmission 42 may be switched between its high-range and low-range positions according to the on-off states of the solenoid valve 278.

In the shift position D, the first line pressure Pl1 is applied to the control port 164. Consequently, once the spool 272 has been located in the high-range position, the control chamber 265 is disconnected from the control port 266, but connected to the control port 264. Therefore, the first line pressure Pl1 from the control port 264 acts on the pressure-receiving areas S1 and S2 of the first and second lands 320, 322 of the spool 272. As a result, the spool 272 is biased toward the spring 274 with a force of $[(S2-S1)\,Pl1+S1\cdot Pz]$. Since the biasing force of the spring 274 is selected to be smaller than the above force $[S2-S1)\,Pl1+S1\cdot Pz]$, the spool 272 is subsequently locked in the high-range position (on the side of the spring 274), irrespective of the subsequent on-off state of the solenoid valve 278. Thus, the shift valve 250 comprises lock means whereby the auxiliary transmission 42 is held in its high-range position when shift position D is selected.

A shift-timing valve 290 has: a control port 292 communicating with the actuator 57 of the high-range clutch 56; an input port 294 communicating with the output port 256 of the shift valve 250; an output port 296 communicating with the actuator 59 of the low-range brake band 58; a drain 298; a spool 300; and a pring 302 biasing the spool 300 toward the port 292. When the shift valve 250 is switched from the low-range position to the high-range position, the second line pressure Pl2 is delivered from the output port 254 to the actuator 57 of the high-range clutch 56. However, while the pressure in the actuator 57 of the high-range clutch 56 is relatively low, the spool 300 is held on the side of the port 292 by the spring 302, the fluid in the actuator 59 of the low-range brake band 58 is discharged slowly from the drain 260 via the port 262 of the shift valve 250 and the orifice 258. As the pressure in the actuator 57 of the high-range clutch 56 is elevated, the spool 300 is moved against the force of the spring 302 by the pressure at the port 292, whereby the fluid in the actuator 59 of the low-range brake band 58 is discharged rapidly from the darin 298 of the shift-timing valve. As a result, upon the auxiliary transmission 42 being shifted up, the release of the low-range brake band 58 is suitably delayed, in order to alleviate a shifting shock of the transmission 42.

The secondary pressure Pz from the secondary pressure conduit 82 is applied to the solenoid valves 100, 114, 116 and 278, which serve to release the secondary pressure Pz as required. In a hydraulic control device disclosed in Japanese Patent Application No. 59-12017, as previously indicated, however, the throttle pressure Pth is applied to solenoid valves. In this case, therefore, the biasing force of a spring and the force generated by a solenoid coil must be determined so as to cope with the maximum throttle pressure. Accordingly, the solenoid valve must be relatively large-sized, and the response characteristics of a spool of a spool valve associated with the solenoid valve are degraded when the throttle pressure is relatively low. Further, the spring force acting on the spool is difficult to set. In the illustrated embodiment wherein the secondary pressure Pz is used for the solenoid valves, the above-indicated disadvantages are eliminated, and the freedom of designing of the device is improved.

Figure 10:
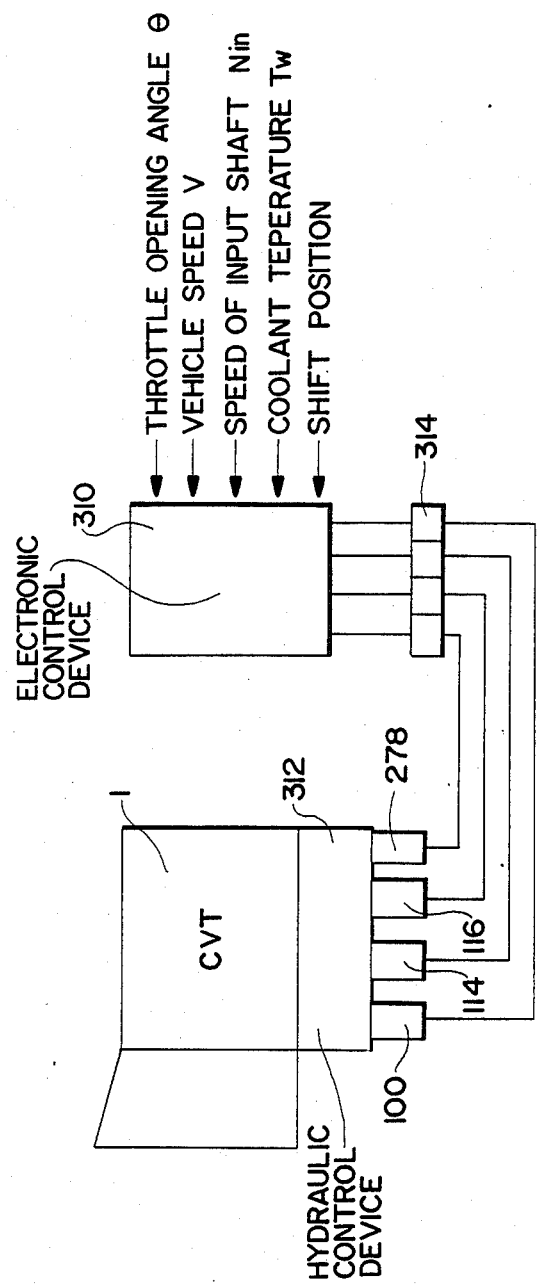
FIG. 10 is a schematic diagram showing a general control arrangement for controlling the power transmitting system.

FIG. 10 is a schematic block diagram showing a general control arrangement for controlling the power transmitting system which has been described hitherto. The control arrangement includes an electric control device 310 which receives inptu signals indicative of various parameters such as throttle opening angle $\theta$, running speed V of the vehicle, rotating speed Nin at the input side of the CVT 1, temperature Tw of coolant for the engine and selected shift position. The electronic control device 310 controls the solenoid valves 100, 114, 116 and 278 through amplifier stage 314.

The operation of the shift valve 250 will now be described, in relation to the operating positions of the manual valve 80 and auxiliary transmission 42.

While the manual shaft valve 80 is placed in the shift position L (Low), the following two methods are available to control the auxiliary transmission 42 (shift valve 250) by means of the solenoid valve 278:

(A) The auxiliary transmission 42 is held in its low-range position.

(B) The auxiliary transmission 42 is placed selectively in the low-range position or high-range position, depending upon the driving conditios of the vehicle, as previously indicated.

While the manual shift valve 80 is placed in the shift position D (Drive), P (Parking), R (Reverse) or N (Neutral), the auxiliary transmission 42 is held in its high-range position.

In the following cases, the auxiliary transmission 42 will not be set to its high-range position immediately after the manual shift valve 80 has been shifted fromthe position L to the position D:

(1) if the control method (A) is selected, or (2) while the auxiliary transmission 42 is placed in the low-range position if the control method (B) is selected.

In the above cases, the solenoid valve 278 (which is currently on) will not be turned off immediately after the manual valve 80 is moved to its shift position D. That is, the solenoid valve 278 will be turned off only after the vehicle has satisfied the optimum conditions for shifting up the auxiliary transmission 42.

Similarly, if the manual valve 80 is moved to the shift position L from the shift position P, R, N or D, the solenoid valve 278 (which is currently. off) will be turned on only after the optimum shift-down conditions have been established.

Referring back to FIG. 5, there will be described the operation of the shift valve 250 when the solenoid valve 278 is turned off while manual valve 80 is placed in the shift position D (Drive).

While the solenoid valve 278 is held on, the pressure in the control ports 266, 268 is released through the drain 280, whereby the spool 272 is forced by the spring 274 towrad the port 268, i.e., placed in its low-range position.

When the solenoid valve 278 is turned off, the secondary pressure Pz is applied to the control ports 266, 268. With the spool 272 held in the low-range position, the secondary pressure Pz from the control port 266 acts on the pressure-receiving area S2 of the second lands 322, thereby forcing the spool 272 against the biasing force of the spring 274, that is, toward the high-range position.

As a result, the spool 272 is moved from the low-range position on the side of the port 268 toward the high-range position on the side of the spring 274. After the spool 272 has been moved a predetermined distance toward the high-range position, the first land 320 disconnects the fluid communication between the control port 266 and the control chamber 265. Subsequently, the spool 272 is moved toward the high-range position with the secondary pressure Pz acting on the pressure-receiving area S1 (lower face as seen in FIG. 5) of the first land 320.

While the spool 272 of the shift valve 250 is placed in its high-range position with the manual valve 80 held in the shift position D, the first line pressure Pl1 from the port 87 of the manual valve 80 is applied to the control port 264 of the shift valve 250, and to the control chamber 265 between the first and second lands 320, 322, whereby the spool 272 is biased toward the high-range position. As the biasing force based on the first line pressure Pl1 is sufficiently greater than the biasing force of the spring 274, the spool 272 of the shift valve 250 will not be returned from its high-range position back to its low-range position even if the secondary pressure Pz acting on the first land 320 is removed upon erroneous energization of the solenoid valve 278 while the manual valve 80 is held in the shift position D (Drive). Hence, the instant arrangement prevents a shift-down shock to the auxiliary transmission 42.

As will be apparent from the foregoing description, the first and second lands 320, 322, control ports 264, 266, and control chamber 265 of the shift valve 250, and the port 87 of the manual valve 80 constitute lock means for holding the shift valve 250 in the high-range position while the manual valve 80 is placed in the shift position D (Drive).

While the present invention has been described in its preferred embodiment, it will be obvious to those skilled in the art that various changes, modifications and improvements may be made within the spirit and scope of the invention defined in the appended claims.

What is claimed is:

1. A hydraulic control apparatus for controlling a hydraulically-operated power transmitting system for an automotive vehicle, the power transmitting system including a continuously variable transmission and an auxiliary transmission coupled to the continuously variable transmission, the auxiliary transmission having a first and second forward-drive position corresponding to a high and a low speed range, respectively, which high and low speed ranges are selected by an operator controlled shift lever, said hydraulic control apparatus comprising:

a shift valve controlled by an electric control signal so as to be placed selectively in one of a high-range position and a low-range position to place said auxiliary transmission in said first and second forward-drive positions, respectively, said shift valve comprising lock means for holding said shift valve in said high-range position, irrespective of said electric control signal, while said high speed range is selected by the shift lever.

2. A hydraulic control apparatus for controlling a hydraulically-operated power transmitting system for an automotive vehicle, the power transmitting system including a continuously variable transmission and an auxiliary transmission coupled to the continuously variable transmission, the auxiliary transmission having a first and second forward-drive position corresponding to a high and a low speed range, respectively, which high and low speed ranges are selected by an operator controlled shift lever, said hydraulic control apparatus comprising:
- a high-range frictional coupling unit hydraulically operated to establish said first forward-drive position of the auxiliary transmission;
- a low-range frictional coupling unit hydraulically operated to establish said second forward-drive position of the auxiliary transmission;
- a shift valve comprising a spool operable between a high-range position and a low-range position to control the flow of a hydraulic fluid to said high-range and low-range frictional coupling units, for placing said auxiliary transmission selectively in said first and second forward-drive positions;
- a solenoid valve movable between ON and OFF positions for controlling said spool so as to place said spool selectively in said high-range and low-range positions,
- said shift valve further comprising means defining a control port through which a hydraulic control pressure is applied to said spool in said high-range position, for locking the spool in said high-range position, irrespective of the position of said solenoid valve, while said high range is selected by the shift lever.

3. A hydraulic control apparatus according to claim 2, further comprising means for applying a biasing hydraulic pressure to said spool of the shift valve in a direction toward said high-range position, said solenoid valve being operable between said OFF position to permit said biasing hydraulic pressure to be applied to said spool, and said ON position to release said biasing hydraulic pressure.

4. A hydraulic control apparatus according to claim 3, wherein said spool of the shift valve has a first land which receives said biasing hydraulic pressure to bias said spool toward said high-range position while the spool is placed in said high-range position, said spool further having a second land which receives said biasing hydraulic pressure to bias said spool toward said high-range position while the spool is placed in said low-range position, said second land having a pressure-receiving area larger than that of said first land, said control port being disposed relative to said spool so that the control port is located between said first and second lands while said spool is placed in said high-range position.

* * * * *